(12) United States Patent
Bulchandani et al.

(10) Patent No.: US 11,005,795 B1
(45) Date of Patent: May 11, 2021

(54) TECHNIQUES FOR MEDIA ITEM DISPLAY CONFIGURATION

(71) Applicant: WhatsApp Inc., Menlo Park, CA (US)

(72) Inventors: Udayan Shiv Bannerjee Bulchandani, Mountain View, CA (US); Alfonso Gomez Jordana Manas, Mountain View, CA (US); Brian Furtado, Union City, CA (US)

(73) Assignee: WHATSAPP INC., Menlo Park, CA (US)

( * ) Notice: Subject to any disclaimer, the term of this patent is extended or adjusted under 35 U.S.C. 154(b) by 159 days.

(21) Appl. No.: 16/432,057

(22) Filed: Jun. 5, 2019

(51) Int. Cl.
*H04L 12/58* (2006.01)
*H04L 29/06* (2006.01)
*G06F 3/0484* (2013.01)

(52) U.S. Cl.
CPC ............ *H04L 51/10* (2013.01); *G06F 3/0484* (2013.01); *H04L 63/0435* (2013.01)

(58) Field of Classification Search
CPC ...... G06F 3/165; G06F 3/0482; G06F 16/176; G06F 16/2365; G06F 16/9535; G06F 16/13; G06F 16/183; G06F 16/185; G06N 20/00
See application file for complete search history.

*Primary Examiner* — Michael A Keller
*Assistant Examiner* — Thao D Duong
(74) *Attorney, Agent, or Firm* — Kacvinsky Daisak Bluni PLLC

(57) ABSTRACT

Techniques for media item display configuration are described. In one embodiment, an apparatus may comprise a media management component operative to retrieve a plurality of contact-associated media items associated with a plurality of contacts for a user account associated with a messaging client by a messaging system; retrieve an engagement score for each of the plurality of contacts; and order the plurality of contact-associated media items based on the engagement score for each of the plurality of contacts; and a user interface component operative to receive a mixed-contact media display interface invocation in the messaging client for the messaging system; and display the plurality of contact-associated media items in a mixed-contact media display interface according to the ordering of the plurality of contact-associated media items. Other embodiments are described and claimed.

20 Claims, 12 Drawing Sheets

700

Receive a mixed-contact media display interface invocation in a messaging client for a messaging system.
702

Retrieve a plurality of contact-associated media items associated with a plurality of contacts for a user account associated with the messaging client by the messaging system.
704

Retrieve an engagement score for each of the plurality of contacts.
706

Order the plurality of contact-associated media items based on the engagement score for each of the plurality of contacts.
708

Display the plurality of contact-associated media items in a mixed-contact media display interface according to the ordering of the plurality of contact-associated media items.
710

TECHNIQUES FOR MEDIA ITEM DISPLAY CONFIGURATION

BACKGROUND

Users may interact with each other in a messaging system, sending messages back and forth to each other in a text-based conversation between two or more users. A user may have a user account associated with them in the messaging system. The user account is an online identity for the user and can be used as a destination for messages directed to the user, and generally for coordinating the user's access to and use of the messaging system. A user may access the messaging system from a variety of endpoints, including mobile devices (e.g., cellphones), desktop computers, web browsers, specialized messaging clients, etc.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques for media item display configuration. Some embodiments are particularly directed to techniques for media item display configuration based on engagement-based ranking. In one embodiment, for example, an apparatus may comprise a media management component operative to retrieve a plurality of contact-associated media items associated with a plurality of contacts for a user account associated with a messaging client by a messaging system; retrieve an engagement score for each of the plurality of contacts; and order the plurality of contact-associated media items based on the engagement score for each of the plurality of contacts; and a user interface component operative to receive a mixed-contact media display interface invocation in the messaging client for the messaging system; and display the plurality of contact-associated media items in a mixed-contact media display interface according to the ordering of the plurality of contact-associated media items. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 7 illustrates an embodiment of a logic flow for the system of FIG. 1.

DETAILED DESCRIPTION

Figure 1:
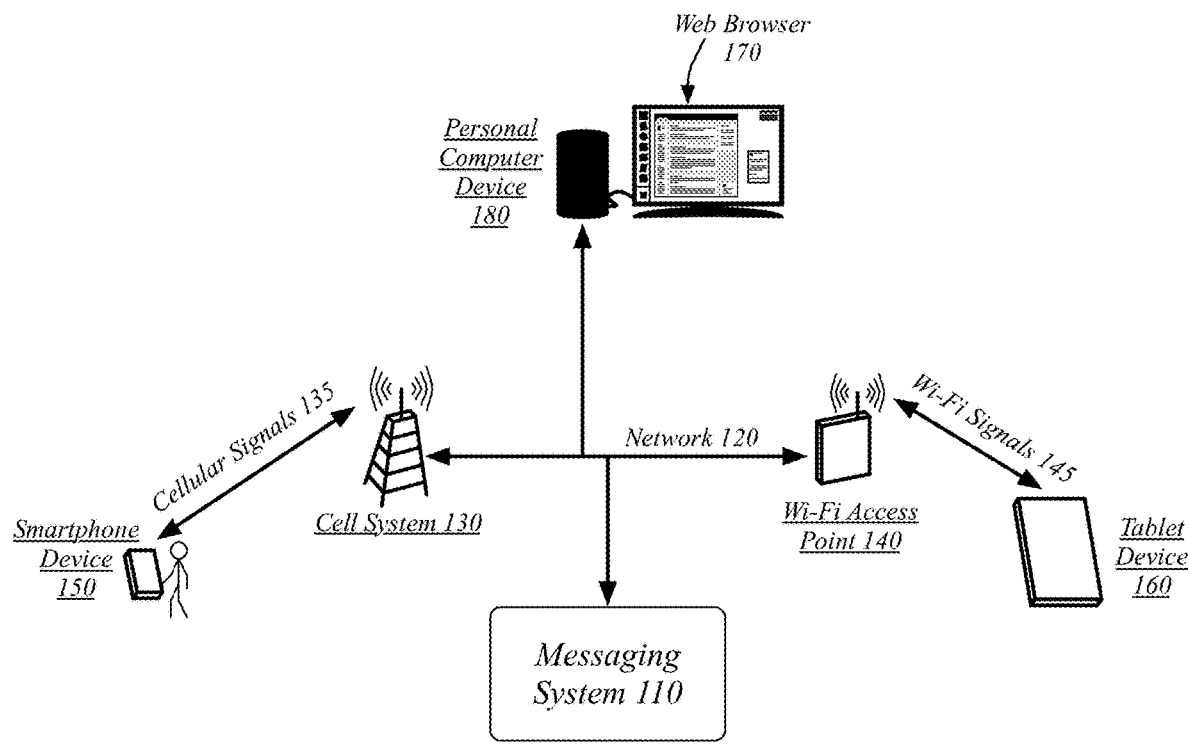
FIG. 1 illustrates an embodiment of a media distribution and display system.

Users of a messaging system may interact with each other using, at least in part, media content, such as images, animated images, video, audio, and other media items. Users may transmit media content in individual (i.e., one-on-one) or group conversation. Similarly, users may transmit media content as a broadcast to a broad group of friends, associates, and other relations that they may have in a messaging system, defined by their contacts, to promote media content they associate with themselves. Users may benefit from a distribution channel for media content in which the audience for the content is determined based on the distributing user's messaging relationships, their set of contacts. For example, users may define their audience as including all their contacts, a chosen subset of contacts, or all their contents excluding a chosen subset of contacts.

Further, the media distributed via a composition channel may be displayed in association with the user in a messaging interface to promote the discovery of a user's compositions in association with messaging interaction with that user. This may encourage the distribution of media that is selected to compliment messaging relationships. Users may distribute media content that specifically highlights the context with which they engage in their friends and the distribution of the media content may promote messaging interactions in relation to the distributed media content.

For example, a user may distribute a composition comprising a photo of a ticket stub for a film, play, concert, sporting event, or other performance for which they are currently in line awaiting entry. Other users viewing the photo may be encouraged to engage with the distributing user about the event they are about to attend. By not sending the photo to a particular message thread, the distributing user may be empowered to allow other users to come to them to comment on their photo and the event. By not posting the photo to a specific thread, but instead having it available in a discovery interface for contacts' media compositions, a user may feel comfortable increasing the frequency with which they distribute such media, knowing that media which may, in some cases, represent smaller life moments will only be promoted to those who are seeking media compositions.

As a result, the embodiments can improve a user's experience in distribution media content through a messaging system and can increase a user's engagement with a messaging system thanks to the addition of a different distribution channel that accommodates a different approach to the distribution of media.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-a may include components 122-1, 122-2, 122-3, 122-4 and 122-5. The embodiments are not limited in this context.

FIG. 1 illustrates a block diagram for a media distribution and display system 100. In one embodiment, the media distribution and display system 100 may comprise a computer-implemented system having software applications comprising one or more components. Although the media distribution and display system 100 shown in FIG. 1 has a limited number of elements in a certain topology, it may be appreciated that the media distribution and display system 100 may include more or less elements in alternate topologies as desired for a given implementation.

Messaging servers 110 may comprise one or more messaging servers operated by a messaging platform as part of a messaging system. A messaging server may comprise an Internet-accessible server, with the network 120 connecting the various devices of the messaging system comprising, at least in part, the Internet. A messaging system may use the messaging servers 110 to support messaging for various user client devices.

A user may own and operate a smartphone device 150. The smartphone device 150 may comprise an iPhone® device, an Android® device, a Blackberry® device, or any other mobile computing device conforming to a smartphone form. The smartphone device 150 may be a cellular device capable of connecting to a network 120 via a cell system 130 using cellular signals 135. In some embodiments and in some cases the smartphone device 150 may additionally or alternatively use Wi-Fi or other networking technologies to connect to the network 120. The smartphone device 150 may execute a messaging client, web browser, or other local application to access the messaging servers 110.

The same user may own and operate a tablet device 160. The tablet device 150 may comprise an iPad® device, an Android® tablet device, a Kindle Fire® device, or any other mobile computing device conforming to a tablet form. The tablet device 160 may be a Wi-Fi device capable of connecting to a network 120 via a Wi-Fi access point 140 using Wi-Fi signals 145. In some embodiments and in some cases the tablet device 160 may additionally or alternatively use cellular or other networking technologies to connect to the network 120. The tablet device 160 may execute a messaging client, web browser, or other local application to access the messaging servers 110.

The same user may own and operate a personal computer device 180. The personal computer device 180 may comprise a Mac OS® device, Windows® device, Linux® device, or other computer device running another operating system. The personal computer device 180 may be an Ethernet device capable of connecting to a network 120 via an Ethernet connection. In some embodiments and in some cases the personal computer device 180 may additionally or alternatively use cellular, Wi-Fi, or other networking technologies to the network 120. The personal computer device 180 may execute a messaging client, web browser 170, or other local application to access the messaging servers 110.

A messaging client may be a dedicated messaging client. A dedicated messaging client may be specifically associated with a messaging provider administering the messaging platform including the messaging servers 110. A dedicated messaging client may be a general client operative to work with a plurality of different messaging providers including the messaging provider administering the messaging platform including the messaging servers 110.

The messaging client may be a component of an application providing additional functionality. For example, a social networking service may provide a social networking application for use on a mobile device for accessing and using the social networking service. The social networking service may include messaging functionality such as may be provided by messaging servers 110. It will be appreciated that the messaging servers 110 may be one component of a computing device for the social networking service, with the computing device providing additional functionality of the social networking service. Similarly, the social networking application may provide both messaging functionality and additional social networking functionality.

In some cases a messaging endpoint may retain state between user sessions and in some cases a messaging endpoint may relinquish state between user session. A messaging endpoint may use a local store to retain the current state of a message inbox. This local store may be saved in persistent storage such that the state may be retrieved between one session and the next, including situations in which, for example, a local application is quit or otherwise removed from memory or a device is powered off and on again. Alternatively, a messaging endpoint may use a memory cache to retain the current state of a message inbox but refrain from committing the state of the message inbox to persistent storage.

A messaging endpoint that retains the state of a message inbox may comprise a dedicated messaging application or a messaging utility integrated into another local application, such as a social networking application. A messaging endpoint that relinquishes state of a message inbox may comprise messaging access implemented within a web browser. In one embodiment, a web browser, such as web browser 170 executing on personal computer device 180, may execute HTML code that interacts with the messaging server to present messaging functionality to a user.

A user may send and receive messages from a plurality of devices, including the smartphone device 150, tablet device 160, and personal computer device 180. The user may use a first messaging application on the smartphone device 150, a second messaging application on the tablet device 160, and the web browser 170 on the personal computer device 180. The first and second messaging applications may comprise installations of the same application on both devices. The first and second messaging applications may comprise a smartphone-specific and a tablet-specific version of a common application. The first and second messaging application may comprise distinct applications.

Messaging interactions mediated by a messaging system may be organized into shared spaces known as message threads. A message thread may collect together the messages shared between a particular group of users. Messages sent individually between a pair of users may be collected into a one-on-one message thread uniquely associated with the private messaging between the pair of users. Messages sent between a group of three or more users may not be uniquely defined by their membership, but instead by, in some embodiments, an identifier uniquely identifying the group thread. Membership in a group thread may, in some embodiments, vary over time, adding and/or losing members.

The messaging system may use knowledge generated from interactions in between users. As such, to protect the privacy of the users of the messaging system and the larger social-networking system, messaging system may include an authorization server (or other suitable component(s)) that allows users to opt in to or opt out of having their actions logged by the messaging system, for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Further, any logging shared outside of a client device may be subject to anonymization and aggregation procedures that protect the privacy of the individual users of the messaging system. For instance, only information that does not indicate specific interactions between specific users, but instead reflects broad trends of interactions or that reflects the success of various optimization parameters, may be provided to the messaging system. Authorization servers or other authorization and anonymization processes may be used to enforce one or more privacy settings of the users of the messaging system and other elements of a social-networking system through blocking, data hashing, anonymization, or other suitable techniques as appropriate.

Figure 2:
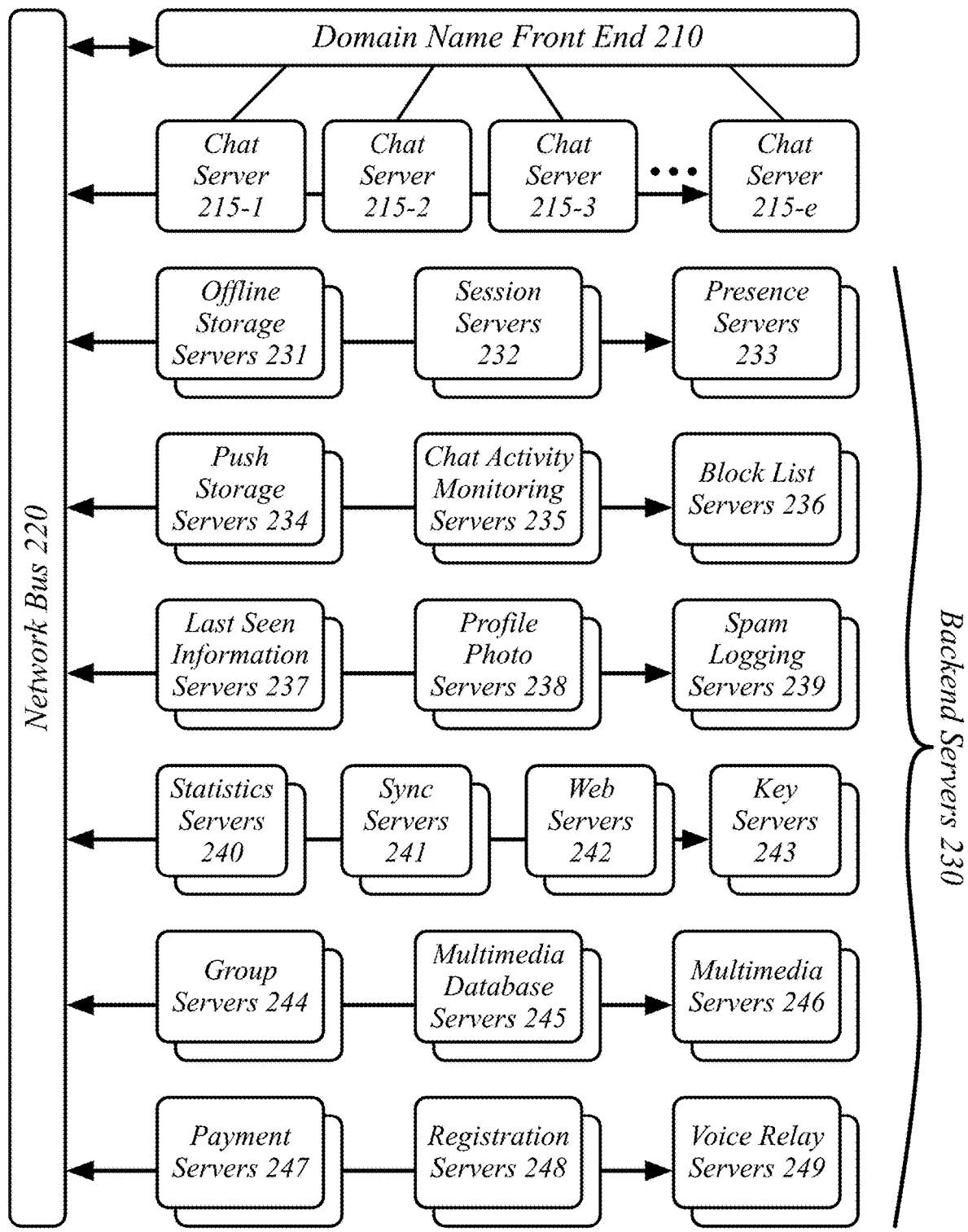
FIG. 2 illustrates an embodiment of a messaging system.

FIG. 2 illustrates an embodiment of a plurality of servers implementing various functions of a messaging system 200. It will be appreciated that different distributions of work and functions may be used in various embodiments of a messaging system 200. The messaging system 200 may comprise the media distribution and display system 100 with the operations of the media distribution and display system 100 comprising a portion of the overall operations of the messaging system 200. The illustrated embodiment of the messaging system 200 may particularly correspond to a portion of the messaging servers 110 described with reference to FIG. 1 comprising one or more server devices providing messaging services to the user of the messaging system 200.

The various servers of the messaging system 200 are connected via a network bus 220. The network bus 220 provides network connectivity between the domain name front end 210, the servers of the messaging system 220, and various external devices, such as client devices. Each of the servers is independently connected to the network bus 220 such that they may independently communicate with each other and/or user devices via the network bus 220.

The messaging system 200 may comprise a domain name front end 210. The domain name front end 210 may be assigned one or more domain names associated with the messaging system 200 in a domain name system (DNS). The domain name front end 210 may receive incoming connections and distribute the connections to servers providing various messaging services.

The messaging system 200 may comprise one or more chat servers 215. The chat servers 215 may comprise front-end servers for receiving and transmitting user-to-user messaging updates such as chat messages. Incoming connections may be assigned to the chat servers 215 by the domain name front end 210 based on workload balancing.

The messaging system 200 may comprise backend servers 230. The backend servers 230 may perform specialized tasks in the support of the chat operations of the front-end chat servers 215. A plurality of different types of backend servers 230 may be used. It will be appreciated that the assignment of types of tasks to different backend serves 230 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging system 200 may comprise one or more offline storage servers 231. The one or more offline storage servers 231 may store messaging content for currently-offline messaging endpoints in hold for when the messaging endpoints reconnect.

The messaging system 200 may comprise one or more sessions servers 232. The one or more session servers 232 may maintain session state of connected messaging endpoints.

The messaging system 200 may comprise one or more presence servers 233. The one or more presence servers 233 may maintain presence information for the messaging system 200. Presence information may correspond to user-specific information indicating whether or not a given user has an online messaging endpoint and is available for chatting, has an online messaging endpoint but is currently away from it, does not have an online messaging endpoint, and any other presence state.

The messaging system 200 may comprise one or more push storage servers 234. The one or more push storage servers 234 may cache push requests and transmit the push requests to messaging endpoints. Push requests may be used to wake messaging endpoints, to notify messaging endpoints that a messaging update is available, and to otherwise perform server-side-driven interactions with messaging endpoints.

The messaging system 200 may comprise one or more chat activity monitoring servers 235. The one or more chat activity monitoring servers 235 may monitor the chats of users to determine unauthorized or discouraged behavior by the users of the messaging system 200. The one or more chat activity monitoring servers 235 may work in cooperation with the spam logging servers 239 and block list servers 236, with the one or more chat activity monitoring servers 235 identifying spam or other discouraged behavior and providing spam information to the spam logging servers 239 and blocking information, where appropriate to the block list servers 236.

The messaging system 200 may comprise one or more block list servers 236. The one or more block list servers 236 may maintain user-specific block lists, the user-specific incoming-block lists indicating for each user the one or more other users that are forbidden from transmitting messages to that user. Alternatively or additionally, the one or more block list servers 236 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging system 200 may comprise one or more last seen information servers 237. The one or more last seen information servers 237 may receive, store, and maintain information indicating the last seen location, status, messaging endpoint, and other elements of a user's last seen connection to the messaging system 200.

The messaging system 200 may comprise one or more profile photo servers 238. The one or more profile photo servers 238 may store and make available for retrieval profile photos for the plurality of users of the messaging system 200.

The messaging system 200 may comprise one or more spam logging servers 239. The one or more spam logging servers 239 may log known and suspected spam (e.g., unwanted messages, particularly those of a promotional nature). The one or more spam logging servers 239 may be operative to analyze messages to determine whether they are spam and to perform punitive measures, in some embodiments, against suspected spammers (users that send spam messages).

The messaging system 200 may comprise one or more statistics servers 240. The one or more statistics servers may compile and store statistics information related to the operation of the messaging system 200 and the behavior of the users of the messaging system 200.

The messaging system 200 may comprise one or more sync servers 241. The one or more sync servers 241 may sync the messaging system 240 with contact information from a messaging endpoint, such as an address book on a mobile phone, to determine contacts for a user in the messaging system 200.

The messaging system 200 may comprise one or more web servers 242. The one or more web servers 242 may engage in hypertext transport protocol (HTTP) and hypertext transport protocol secure (HTTPS) connections with web browsers. The one or more web servers 242 may, in some embodiments, host the remote web server 350 as part of the operation of the media distribution and display system 100.

The messaging system 200 may comprise one or more key servers 243. The one or more key servers 243 may host public keys for public/private key encrypted communication.

The messaging system 200 may comprise one or more group servers 244. The one or more group servers 244 may maintain lists of groups, add users to groups, remove users from groups, and perform the reception, caching, and forwarding of group chat messages.

The messaging system 200 may comprise one or more multimedia database (MMD) servers 245. The MMD servers 245 may store a database, which may be a distributed database, of media objects known to the messaging system 200. In some embodiments, only media objects currently stored or otherwise in-transit within the messaging system 200 may be tracked by the MMD servers 245. In other embodiments, the MMD servers 245 may maintain a record of media objects that are no longer in-transit, such as may be for tracking popularity or other data-gathering purposes.

The MMD servers 245 may determine the storage location of media objects when they are to be stored by the messaging system 200, such as on multimedia servers 246. The MMD servers 245 may determine the existing storage location of media objects when they are to be transmitted by the messaging system 200, such as which of a plurality of multimedia servers 236 store a particular media object. The MMD servers 245 may generate the uniform resource locators (URLs) for use by messaging clients to request and retrieve media objects. The MMD servers 245 may track when a media object has been corrupted or otherwise lost and should be reacquired.

The messaging system 200 may comprise one or more multimedia servers 246. The one or more multimedia servers may store multimedia (e.g., images, video, audio) in transit between messaging endpoints, multimedia cached for offline endpoints, and may perform transcoding of multimedia.

The messaging system 200 may comprise one or more payment servers 247. The one or more payment servers 247 may process payments from users. The one or more payment servers 247 may connect to external third-party servers for the performance of payments.

The messaging system 200 may comprise one or more registration servers 248. The one or more registration servers 248 may register new users of the messaging system 200.

The messaging system 200 may comprise one or more voice relay servers 249. The one or more voice relay servers 249 may relay voice-over-internet-protocol (VoIP) voice communication between messaging endpoints for the performance of VoIP calls.

Figure 3:
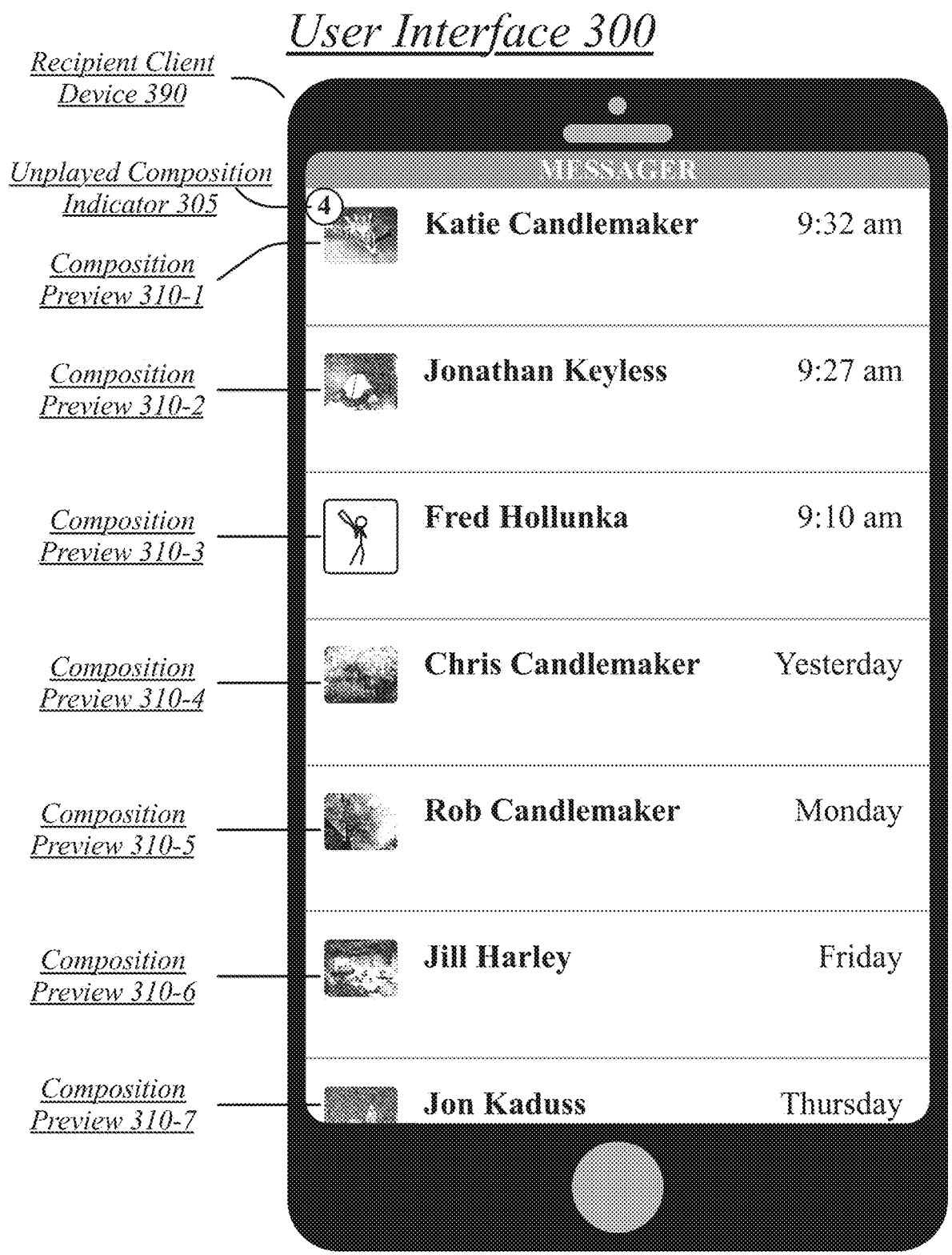
FIG. 3 illustrates an embodiment of a user interface for a messaging client displaying composition availability in an inbox.

FIG. 3 illustrates an embodiment of a user interface 300 for a messaging client displaying composition availability in a composition inbox.

In some embodiments, media compositions may have a limited availability, such as twenty-four hours, one week, thirty days, etc. Further, in some cases, some users may refrain from generating compositions. As such, some users may have available compositions and some users may not have available compositions. Therefore, the composition inbox may comprise only a subset of the contacts for a user.

Each composition may be displayed in association with a visual identifier indicating the originating user with whom the message thread is associated. Each displayed composition may be associated with the name of the one or more other users, an indicator of the time of a most-recent composition, and/or a preview of the composition. Where one or more compositions are available, the preview may be displayed in associated with an indicator indicating the number of compositions available for that user.

In the illustrated embodiment of FIG. 3, compositions previews 310 are displayed to indicate that their associated contacts have an available composition and to provide a preview of at least one of an available one or more compositions. An unread composition indicator 305 is displayed in association, and in proximity, to the composition preview 310-1 for a first message thread to indicate that one or more—in this case four—compositions are available that have not yet been played by the user of the recipient client device 390. In contrast, the composition preview 310-2 for a second contact is displayed without an associated unplayed composition indicator to indicate that all of the available compositions for the second message thread have already been played by the user of the recipient client device 390. In the illustrated embodiment, the unread composition indicator 305 indicates the number of unplayed media compositions. However, in other embodiments, the unread composition indicator 305 may be a general symbol indicating that one or more unplayed media compositions are available without the number of unplayed media compositions, such as by overlaying a play symbol on top of a composition preview where the composition preview is of a media composition that is unplayed by the user of the recipient client device 390.

A composition preview for an image may comprise a resized version of that image. A composition preview for a video may comprise an initial frame or other representative frame of the video. A composition preview for an audio media item may comprise an icon indicating audio media. A composition preview a textual media item may comprise an icon indicating textual content. Various techniques for compositions previews may be used.

Where a user has only a single available composition that single available composition may be used for the composition preview. Where a user has a plurality of available compositions a particular composition may be selected for the composition preview. Where a user has one or more available compositions that have not been played back for the receiving user, the most recent unplayed available composition may be used for the composition preview. Where a use has no available composition that have not been played back for the receiving user—where a receiving user has played all of the available compositions—the most recent available composition may be used for the composition preview.

Figure 4:
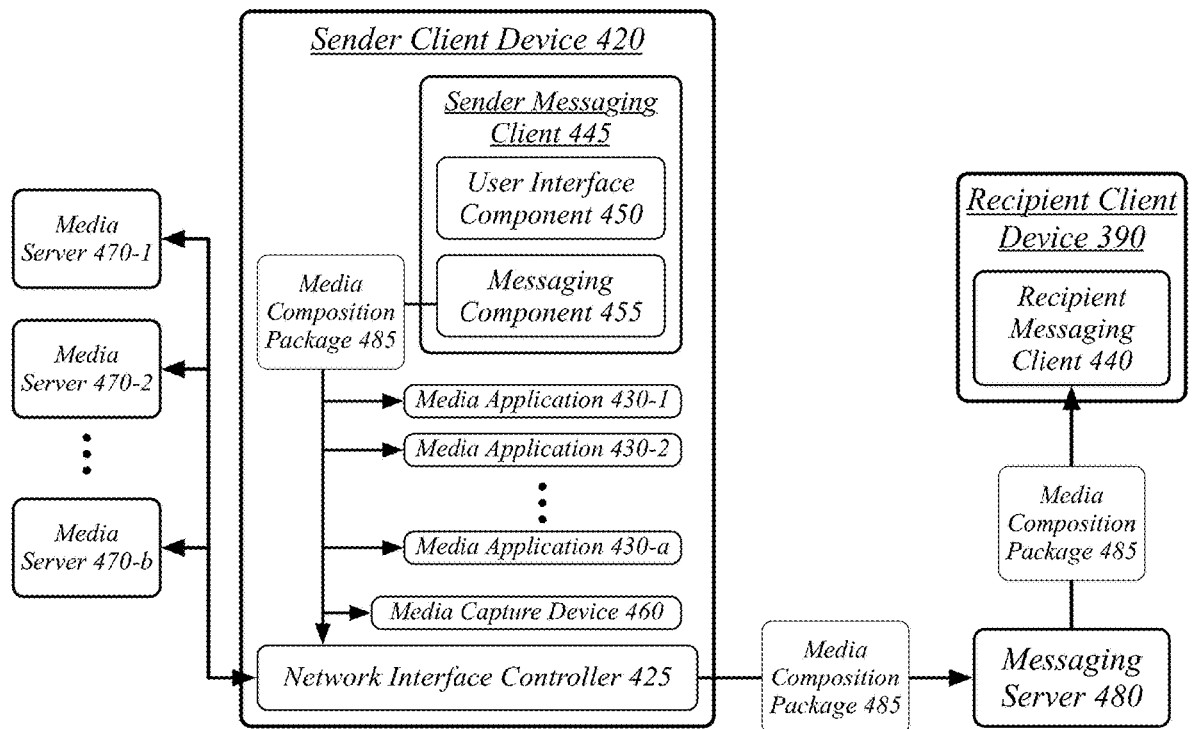
FIG. 4 illustrates a block diagram for a media distribution and display system transmitting a media composition package

FIG. 4 illustrates a block diagram for a media distribution and display system 100 transmitting a media composition package 485.

A user's access to a media distribution and display system 100 may be a messaging client installed as a user application on a client device, such as sender client device 420 or recipient client device 420, and executing locally on the client device as a sender messaging client 445 or recipient messaging client 440. In some cases, the messaging client may include other functionality. For example, the messaging client may be a front-end to a social-networking service, providing messaging services in association with the social-networking service. In many cases, a client device may be a smartphone, cell phone, or other mobile device using a mix of Wi-Fi and cellular data networks to access the Internet and networked resources, though it will be appreciated that any form of network access may be used. For example, one device may tether to another, such as a smart watch tethering to an Internet-capable device (e.g., mobile phone, personal computer) or a mobile phone tethering to a personal computer. A client device may execute a plurality of applications, including the messaging client, one or more media applications 430, and other user applications. In other embodiments, however, the client device may comprise a personal computer device, a portable digital assistant, a tablet device, or any other form of computing device. Similarly, in some situations and embodiments, a user may access the media distribution and display system 100 via a web portal, with the messaging client executing as a web-based application.

A client device may communicate with other devices using wireless transmissions to exchange network traffic. Exchanging network traffic, such as may be included in the exchange of messaging transactions, may comprise transmitting and receiving network traffic via a network interface controller 425 (NIC). A NIC comprises a hardware component connecting a computer device, such as client device, to a computer network. The NIC may be associated with a software network interface empowering software applications to access and use the NIC. Network traffic may be received over the computer network as signals transmitted over data links. The network traffic may be received by capturing these signals and interpreting them. The NIC may receive network traffic over the computer network and transfer the network traffic to memory storage accessible to software applications using a network interface application programming interface (API). The network interface controller 425 may be used for the network activities of the embodiments described herein, including the interoperation of the media applications 430, media servers 470, messaging client 440, and messaging server 480 through network communication. For example, the sender messaging client 440 transmitting or receiving a media composition package 485 to or from a messaging server 480 may be interpreted as using the network interface controller 425 for network access to a communications network for the transmission or reception of information.

The media applications 430 may comprise applications for one or more of searching media content, discovering media content, sharing media content, storing media content, accessing media content, modifying media content, and combining media content. Each of the media applications may be associated one or more media services, either a dedicated media application for a particular media service or a media application interoperating with a plurality of media services. Each of the media services may provide one or more media servers 470 for storing, retrieving, and generally exchanging media content. In some embodiments, one or more of the media servers 470 may be internal to a messaging system, with the messaging system providing media content that may be intermingled with media content from third-party media services providing other media content. The media servers 470 may distribute media packages to the local media applications 430, the media packages comprising one or more media items and associated information.

The client device 420 may include a media capture device 460. The media capture device 460 may comprise a camera operative to capture one or both of still images and moving images (i.e., video) and/or a microphone operative to capture audio either or both of in isolation or in synchronization with the capture of moving images (i.e., film with sound). The media capture device 460 may provide media capture data to the sender messaging client 440, the media capture data comprising one or more of image content, video content, audio content (e.g., for video), media capture context information, and any other media-capture related data. The sender messaging client 440 may be empowered by a client device, such as by an operating system of the client device, to access the media capture device 460—as may be mediated by operating system application programming interfaces (APIs)—and capture media content.

The messaging client 440 may comprise a user interface component 450. The user interface component 450 may be generally arranged to provide interfaces to the functionality of the messaging client. For instance, the user interface component 450 may provide interfaces to media capture, media retrieval, and other media functions. The user interface component 450 may provide interfaces to message viewing, message composition, message sending, and other messaging functions. In general, the user interface component 450 may provide interfaces for any functionality of the messaging client.

Determining the selection of a control, area, or other element of a user interface may comprise receiving an interrupt, API call, signal, or other indication from an interface library and/or operating system of a client device. The user interface component 450 may be operative to receive user interface interactions from the operating system and to translate these user interface interactions into the activation of various user interface elements. In some embodiments, various user interface elements may be registered with an interface library and/or operating system, with the interface library and/or operating system providing user interface interactions in reference to particular user interface elements.

The messaging client may comprise a messaging component 455. The messaging component 455 may be generally arranged to provide messaging services to a user of the client device. Messaging services may comprise the reception of messages, the sending of messages, the maintenance of a history of messages exchanged, and other messaging-related activities. User of the messaging client may be empowered to engage in messaging conversations with a plurality of other users in both private user-to-user conversations, in private group conversations between three or more users, and in public conversations generally open to the messaging community. The messaging component may expose this functionality to the user using the user interface component 450.

The user interface component 450 may be generally arranged to empower a user of the messaging client to configure a media composition. A media composition may correspond to one or more media items (e.g., still images, animated images, video, audio, text), such as an individual media item or a plurality of media items in combination. The user interface component 450 may be generally arranged to empower a user to request the distribution of the media composition to either all or a subset of contacts for the user. The messaging component 455 may transmit the media composition via a messaging system in response to a user request to distribute the media composition, with the media composition embodied in a media composition package 485. In some embodiments, a media composition package 485 may reference one or more media items using references, such as where the media items are uploaded and downloaded, such as may be in encrypted form, from servers of the messaging system.

The media distribution and display system 100 may interact with messaging servers from among a plurality of messaging servers, such as messaging server 480. A messaging server 480 may operate as an intermediary between the messaging endpoints of users of the media distribution and display system 100. Messaging servers may track the current network address of a user's active messaging endpoint or endpoints, such as they change network (e.g., a mobile client device moving between Wi-Fi networks, between cellular data networks, and between Wi-Fi and cellular data networks). Messaging servers may queue messages for messaging endpoints when they are offline or otherwise not accepting new messages.

Messages transmitted via the messaging server 480 may include one or more media items. Where a media item for transmission is already stored on the messaging server 480 or on a media server accessible to the media distribution and display system 100 the messaging server 480 may refrain from transmitting the media item to the client device. Where a media item is represented as a uniform resource locator (URL) to a network-accessible source, the immediate transmission of a media item as part of a media package may be avoided. These techniques may serve to reduce the bandwidth used in sharing media items.

A media item may be managed and manipulated by the media distribution and display system 100 according to a variety of techniques in various embodiments. In some cases, the media item may be directly stored as computer data representation within a media package. For example, an image media item may be stored as a Joint Photographic Expert Group (JPEG) digital image file within a media package. In other cases, the media item may be stored as a reference within a media package, the reference comprising a resource locator—such as a URL—providing a network-accessible address for the media item. As such, while the sender messaging client 440 may retrieve and cache an instance of the media item on the client device for local access, the media item may be received using the resource locator so as to avoid using excessive bandwidth in its transmission. It will be appreciated that, in general, any known technique for formatting and storing media content may be used.

Figure 5:
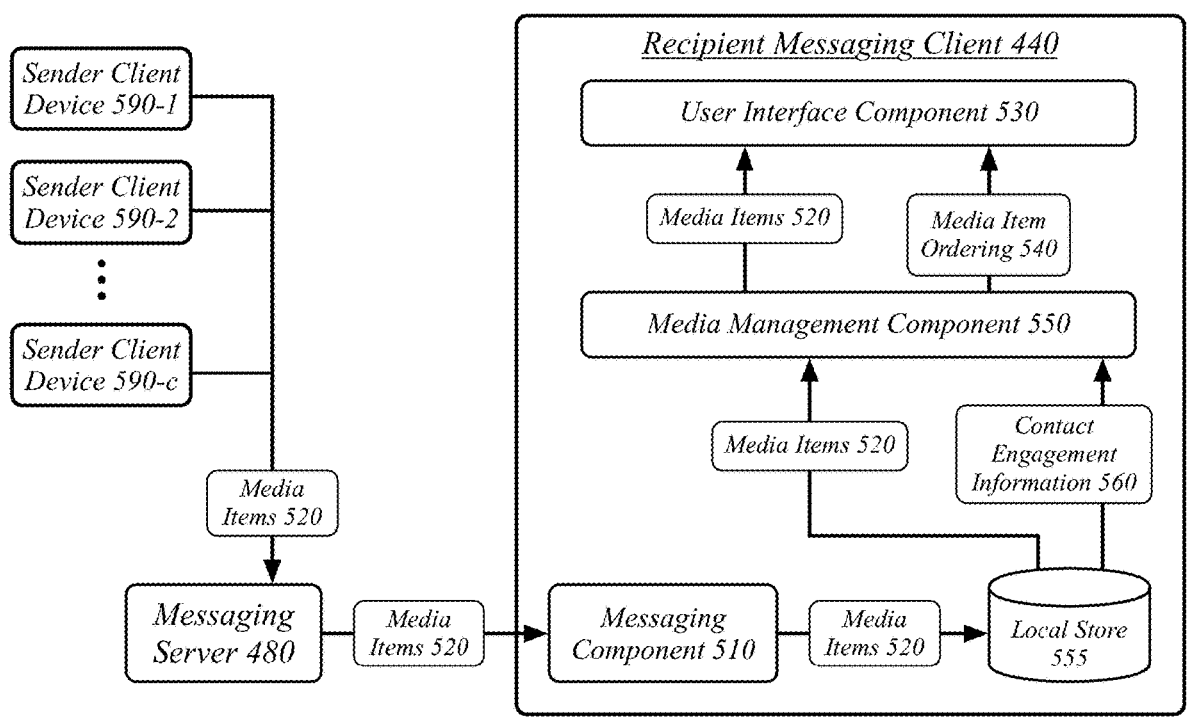
FIG. 5 illustrates a block diagram for a media distribution and display system receiving media items and ordering the media items for display.

FIG. 5 illustrates a block diagram for a media distribution and display system 100 receiving media items 520 and ordering the media items 520 for display.

The messaging component 510 receives a plurality of contact-associated media items 480. The media items 480 may be sent from a plurality of sender client devices 590, each associated with a different sending contact. The media items 480 may be received via a messaging server system for the messaging system 200 using end-to-end encryption, such that the media items 520 are encrypted by the sender client devices 590 and decrypted at the recipient messaging client 440 of the recipient client device 390 without any messaging server 480 of the messaging system 200 either decrypting the media items 520 or being able to decrypt the media items 520 due to lacking the appropriate encryption keys for decrypting the media items 520. The decryption keys may be associated with particular sender client devices 590 and only shared with recipient client devices, such as the recipient client device 390, where each user of the sender client devices 590 indicates they want to share with those recipient client devices. As such, the end-to-end encryption denies the messaging server system access to the media content of the plurality of contact-associated media items. The ordering of the plurality of contact-associated media items 520 is therefore performed based on local data collection on the recipient client device 390 executing the recipient messaging client 440 rather than analysis of media items 520 or messaging content by the messaging servers of the messaging system 200.

During the operation of the recipient messaging client 440, the user interface component 530 receives a mixed-contact media display interface invocation in the recipient messaging client 440 for the messaging system 200. The mixed-contact media display interface invocation is a request from the user to show a mixed-contact media display interface for showing media compositions associated with the user's various contact, such as the user interface 300 described with reference to FIG. 3. The mixed-contact media display interface invocation may be performed by selecting a mixed-contact media display invocation interface element, by selecting a system notification of an incoming contact-associated media item, or through other user interface techniques.

The media management component 550 retrieves a plurality of contact-associated media items 520 associated with a plurality of contacts for a user account associated with the recipient messaging client 440 by the messaging system 200. The media items may be received as part of a push message from the server, or the media management component 550 may pull the media items from the server (e.g., based on user settings). The media items 520 may have been received as one batch, in multiple transmissions from sender client device 590, in individual transmissions for each of the media items 520, or in a combination of individual and batched media items. The plurality of contact-associated media items 520 may comprise ephemeral media items 520 with a defined expiration period, such that the media items 520 are automatically deleted from the recipient client device 390 after the expiration of the defined expiration period.

The media management component 550 retrieves contact engagement information 560 for each of the plurality of contacts that generated the media items 520. This contact engagement information 560 may comprise or may be used to generate an engagement score for each of the plurality of contacts that generated the media items 520. The engagement score represents the engagement the user of the recipient messaging client 440 has had with the sending contact, such as broadly across their interactions using the messaging system 200 or specifically with regards to media items shared by the sending contact with the user of the recipient messaging client 440. The media management component 550 then orders the plurality of contact-associated media items based on the engagement score for each of the plurality of contacts.

The user interface component 530 then displays the plurality of contact-associated media items 520 in a mixed-contact media display interface according to the ordering of the plurality of contact-associated media items 520. The ordering of the plurality of contact-associated media items 520 is determined based on prioritizing—ranking higher, and therefore earlier and more prominently in the display—based on a prioritizing of contact-associated media items with a higher engagement score over contact-associated media items with a lower engagement score.

Additional elements may also be used to determine the ordering. For instance, the media management component 550 may order the plurality of contact-associated media items 520 based on the engagement score for each of the plurality of contacts, a recency measure, and a diversity measure. The recency measure corresponds to the recency with which a media item was received. The diversity measure promotes diversity of content, and is increased where a media item is of a type dissimilar from the other media items on offer and is decreased where a media item is of a type similar to the other media items on offer and may generally represent the distinctness of media type (e.g., video, image, audio, text) within the possible range of media types.

The engagement scores for the contacts are generated based on engagement measures collected on the local recipient client device 390. The engagement measures record user behaviors indicative of engagement, or disengagement, with another contact or, specifically, the media items sent by other contacts. The recipient messaging client 440 comprises a client-side feature datastore in a local store 555 of the recipient client device 390. The client-side feature datastore comprises a plurality of engagement measures for each of the plurality of contacts. The engagement score for each of the plurality of contacts is calculated based on combining the plurality of engagement measures for each of the plurality of contacts using a set of defined engagement measure weights. In some embodiments, to preserve space, engagement measures that are older than a defined expiration period are purged, removed from the client-side feature datastore and therefore the local store 555 of the recipient client device 390.

The plurality of engagement measures correspond to a plurality of event types categorizing different types of events that reflect user engagement with a contact's media items. The plurality of event types may comprise two or more of a row seen event, a row consumed event, a row ignored event, a row view engagement event, a row reply engagement event, an incoming message event, an outgoing message event, an incoming media event, an outgoing media event, an incoming group message event, an outgoing group message event, an incoming group media event, an outgoing group media event, an incoming call event, an outgoing call event, a call incoming media event, and a call outgoing media event.

All of a contact's media items are organized into a single row of the mixed-contact media display interface. As such, engagement with a contact may be measured, at least in part, based on a user's interactions with that contact's corresponding row in the mixed-contact media display interface. A row seen event corresponds to a contact's row being display on screen while the user is browsing the mixed-contact media display interface. A row seen event is logged for each contact whose row is displayed on screen and for those contacts that have a media item displayed on the screen. A row consumed event corresponds to a user showing a meaningful interaction with a contact's media item row. A row consumed event is logged when a media item for the contact is displayed on the screen. A row ignored event corresponds to a user ignoring a contact's media item row that they have seen while browsing the mixed-contact media display interface. A row ignored event is logged when a row has been seen but that used hasn't consumed it. A row view engagement event corresponds to the average percentage view for each media item in the row for a contact, and generates a measure that may be adjusted for status length, content type, and skipped statuses. A row reply engagement event corresponds to a user responding to a contact's media item, and generates a measure that represents the number of media items replies to for a particular contact.

Events may also be logged for individual, one-on-one messaging chats. An incoming message event is logged for a contact when an incoming message from that contact is received in association with an individual message thread with that contact. An outgoing message event is logged for a contact when an outgoing message to that contact is sent by the user of the recipient messaging client 440 in association with an individual message thread with that contact. An incoming media event is logged for a contact when an incoming media item from that contact is received in association with an individual message thread with that contact. An outgoing media event is logged for a contact when an outgoing media item to that contact is sent by the user of the recipient messaging client 440 in association with an individual message thread with that contact.

Events may also be logged for group chats that include three or more users (i.e., two or more users in addition to the user of the recipient messaging client 440). An incoming group message event is logged for a contact when an incoming message from that contact is received in association with a group message thread including that contact. An outgoing group message event is logged for a contact when an outgoing message is sent by the user of the recipient messaging client 440 in association with a group message thread including that contact. An incoming group media event is logged for a contact when an incoming media item from that contact is received in association with a group message thread including that contact. An outgoing group media event is logged for a contact when an outgoing media item is sent by the user of the recipient messaging client 440 in association with a group message thread including that contact.

The messaging clients of the messaging system 200 may empower users to make voice and/or video calls. As such, events may also be logged for calls. An incoming call event is logged for a contact when an incoming call is received from that contact. An outgoing call event is logged for a contact when an outgoing call from the user of the recipient messaging client 440 is sent to the contact. A call incoming media event is logged for a contact when a media item is received from a contact in association with a call with that contact. A call outgoing media event is logged for a contact when a media item is sent to the contact by the user of the recipient messaging client 440 in association with a call with that contact. Calls may be performed in an individual, one-on-one manner or as group calls.

Engagement measures may be recorded as a real number (i.e., a numerical value supporting non-integer decimal values). Engagement measures may be set to decay over time, wherein an exponential decay rate is applied to each engagement measure to reduce the value of engagement measures over time except where increased due to the detection of engagement events. This decay rate is applied whenever an engagement measure is either modified or retrieved: before the value is modified or retrieved, a decay value is applied to the engagement measure in combination with an amount of time since the decay value was last applied to produce a decay of the engagement value according to the decay rate. The time since the decay value was last applied may be calculated by storing and retrieving a timestamp whenever the decay value is applied and comparing that timestamp to the current time.

Each of the plurality of event types may be represented by a plurality of decay-rate-specific engagement measures, wherein each of the plurality of decay-rate-specific engagement measures represents its corresponding event type according to a different decay period. For instance, each event type may have four corresponding measures: one corresponding to events within the past day, one corresponding to events within the past week, one corresponding to events within the past month, and one corresponding to events within the past few months. As such, the media management component 550 may adjust each of the plurality of engagement measures according to a defined decay rate for each of the plurality of engagement measures and a timestamp for each of the plurality of engagement measures prior to combining the plurality of engagement measures.

Engagement measures may be measured in aggregate across all the contacts of a user of the recipient messaging client 440. These aggregate measures are used to normalize engagement measures. Aggregate engagement measures are logged for each of the event types, for each of the decay rates and for each of the event types, to normalize each contact-specific decay-rate-specific engagement measure according to the overall rate at which each event type was engaged with across all contacts for the user of the recipient messaging client 440. This may serve to improve the comparison of contacts that have different distributions of event types.

The media management component 550 may detect an engagement event associated with a contact and update engagement measures for that contact in response. The media management component 550 retrieves a plurality of decay-rate-specific aggregate engagement measures corresponding to an event type of the engagement event. The plurality of decay-rate-specific aggregate engagement measures are aggregated across all contacts in the messaging client. Upon retrieving the decay-rate-specific aggregate engagement measures corresponding to the event type, the media management component 550 decreases the plurality of decay-rate-specific aggregate engagement measures according to a defined decay rate for each of the plurality of decay-rate-specific aggregate engagement measures and an amount of time between a current time and an update timestamp for the plurality of decay-rate-specific aggregate engagement measures. The media management component 550 then increases the plurality of decay-rate-specific aggregate engagement measures based on the engagement event, which may comprise either a defined constant increase or a variable increase based on details of the engagement event. The media management component 550 then stores the plurality of decay-rate-specific aggregate engagement measures in the local store 555. The media management component 550 updates the timestamp for each updated decay-rate-specific aggregate engagement measures to the current time used for applying the defined decay rates.

After applying time decay to the per-contact measures and to the aggregate measures, the media management component 550 normalizes the plurality of decay-rate-specific engagement measures for each of the plurality of contacts based on the plurality of decay-rate-specific aggregate engagement measures to generate a plurality of normalized decay-rate-specific engagement measures for each of the plurality of contacts. The media management component 550 then decreases the plurality of normalized decay-rate-specific aggregate engagement measures according to a defined decay rate for each of the plurality of decay-rate-specific engagement measures and an amount of time between a current time and an update timestamp for the plurality of decay-rate-specific engagement measures. The engagement score for each of the plurality of contacts is then calculated based on combining the plurality of normalized decay-rate-specific engagement measures for each of the plurality of contacts using the set of defined engagement measure weights.

The engagement measures are updated whenever an engagement event is detected. The media management component 550 detects an engagement event associated with a contact and responds by updating the engagement measures. The media management component 550 retrieves the plurality of decay-rate-specific engagement measures for the contact corresponding to the event type of the engagement event and decreases the plurality of decay-rate-specific engagement measures according to a defined decay rate for each of the plurality of decay-rate-specific engagement measures and an amount of time between a current time and an update timestamp for the plurality of decay-rate-specific engagement measures. The media management component 550 then increases the plurality of decay-rate-specific engagement measures based on the engagement event and stores the plurality of decay-rate-specific engagement measures in association with the contact.

The engagement scores for contacts may be recalculated in reaction to various events. Engagement scores for contacts may be recalculated in response to a mixed-contact media display interface invocation. Engagement scores for contacts may be recalculated on a periodic basis, wherein they are recalculated if a defined time period passes without the engagement scores for a contact being recalculated. The engagement score for a particular contact may also be calculated when an incoming media item associated with that contact is received. The messaging component receives an incoming contact-associated media item from an incoming-item contact. The media management component generates an engagement score for the incoming-item contact based on the techniques described herein. The media management component 550 ranks the incoming contact-associated media item according to the engagement score for the incoming-item contact and the user interface component 550 displays it in the mixed-contact media display interface according to the engagement score for the incoming-item contact.

Figure 6:
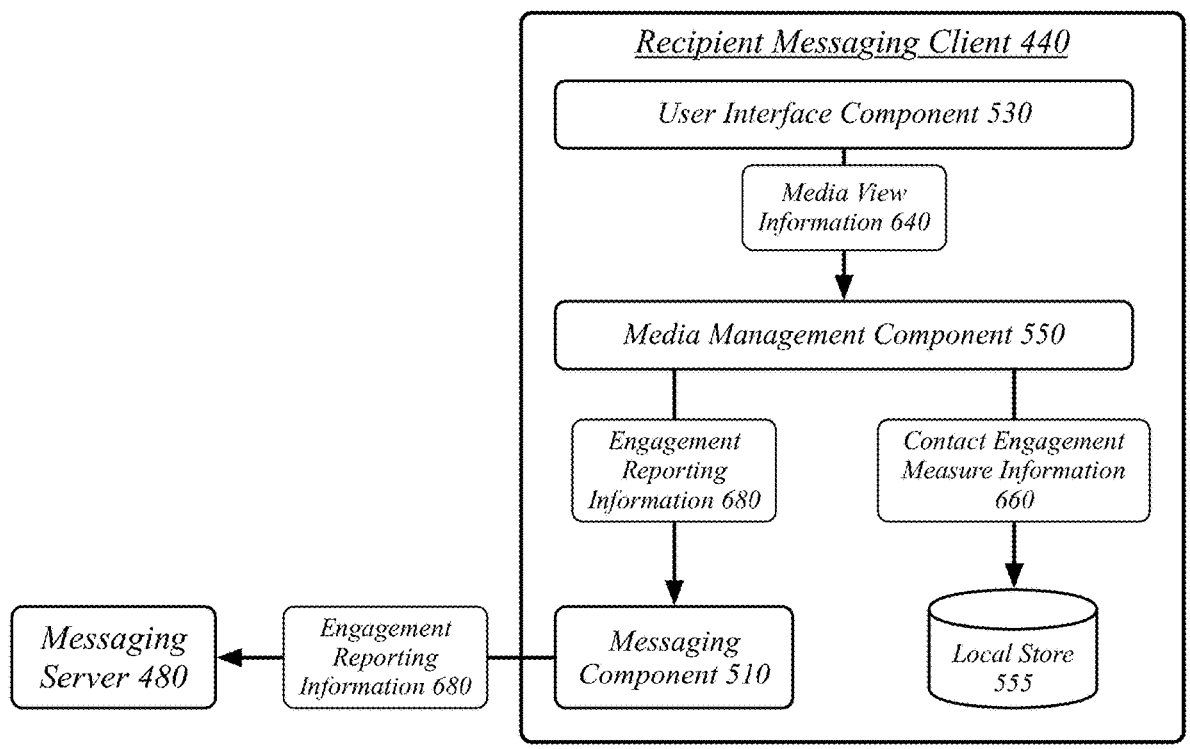
FIG. 6 illustrates an embodiment of a media distribution and display system providing engagement reporting information back to a messaging system.

FIG. 6 illustrates an embodiment of a media distribution and display system 100 providing engagement reporting information 680 back to a messaging system 200.

The engagement score for each of the plurality of contacts is calculated based on combining the plurality of engagement measures for each of the plurality of contacts using a set of defined engagement measure weights. The defined engagement measure weights are used to weight each of the engagement measures when combining them—using addition, multiplication, and/or other mathematical operations—to mathematically combine the engagement measures into a single engagement score for each contact. The defined engagement measure weights reflect the relative importance of the engagement measures. The recipient messaging client 440 receives the set of defined engagement measure weights from the messaging server system. The messaging server 480 may periodically provide an updated set of engagement measure weights to the recipient messaging client 440 via the messaging component 510 for use in determining ranking and ordering for contacts' media items.

The set of defined engagement measure weights are determined by the messaging server system based on engagement success measures received from client devices of the messaging system 200. The messaging system 200 receives anonymized engagement reporting information 680 that represents the success of the media item ranking. The engagement reporting information 680 is anonymized to prevent user-specific and contact-specific details of the operation of the messaging clients from being made visible to the messaging servers, thereby preserving the privacy of the users of the messaging clients.

The engagement success measures represent differences between media item ranking and actual user engagement. The success of the media item ranking is determined by comparing the user's expressed preferences through their interaction with the mixed-contact media display interface with their predicted preferences as represented by the ranking of the media items 520. Engagement reporting information 680 comprising the engagement success measures is provided by the recipient messaging client 440 to a messaging server 480 for analysis and determination of the engagement measure weights for use in future iterations by the messaging clients of determining engagement scores and ranking contacts' media items based thereon.

The engagement success measures comprising two or more of a view time score, a reply score, an ignored status score, and a re-watch score. The engagement success measures are provided for each of the contacts displayed to the user of the recipient messaging client 440. These contacts are provided without identifying contact information (e.g., user identifier, phone number) so that only the success of the ranking is evaluated, without information about what specific users' media items were displayed, viewed, ignored, or otherwise interacted with. The anonymized contacts are provided in the order that the contacts' media items were displayed to the user of the recipient messaging client 440 with the associated engagement success measures measured by the user interface component 530. The messaging server system uses these engagement success measures to determine whether the ranking of the media items was correct. The engagement success measures for each contact are combined to determine the ideal ranking that would have been used based on user engagement, that would maximize the positive engagement success measures (e.g., view time score, reply score, and re-watch score) while minimizing the negative engagement success measures (e.g., ignored status score).

The difference between the actual ordering of the contacts and the ideal ordering of the contacts is then used to determine the overall success of the ranking and therefore the defined engagement measure weights. This measure is then aggregated across a plurality of users and messaging clients to determine the next iteration of defined engagement measure weights, which are then provided back to the messaging clients for use and, ultimately, evaluation and reiteration of weights. Machine learning techniques may be used to improve the defined engagement measure weights based on the evaluated success of the engagement score determination.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 7 illustrates one embodiment of a logic flow 700. The logic flow 700 may be representative of some or all of the operations executed by one or more embodiments described herein.

In the illustrated embodiment shown in FIG. 7, the logic flow 700 may receive a mixed-contact media display interface invocation in a messaging client for a messaging system at block 702.

The logic flow 700 may retrieve a plurality of contact-associated media items associated with a plurality of contacts for a user account associated with the messaging client by the messaging system at block 704.

The logic flow 700 may retrieve an engagement score for each of the plurality of contacts at block 706.

The logic flow 700 may order the plurality of contact-associated media items based on the engagement score for each of the plurality of contacts at block 708.

The logic flow 700 may display the plurality of contact-associated media items in a mixed-contact media display interface according to the ordering of the plurality of contact-associated media items at block 710.

The embodiments are not limited to this example.

Figure 8:
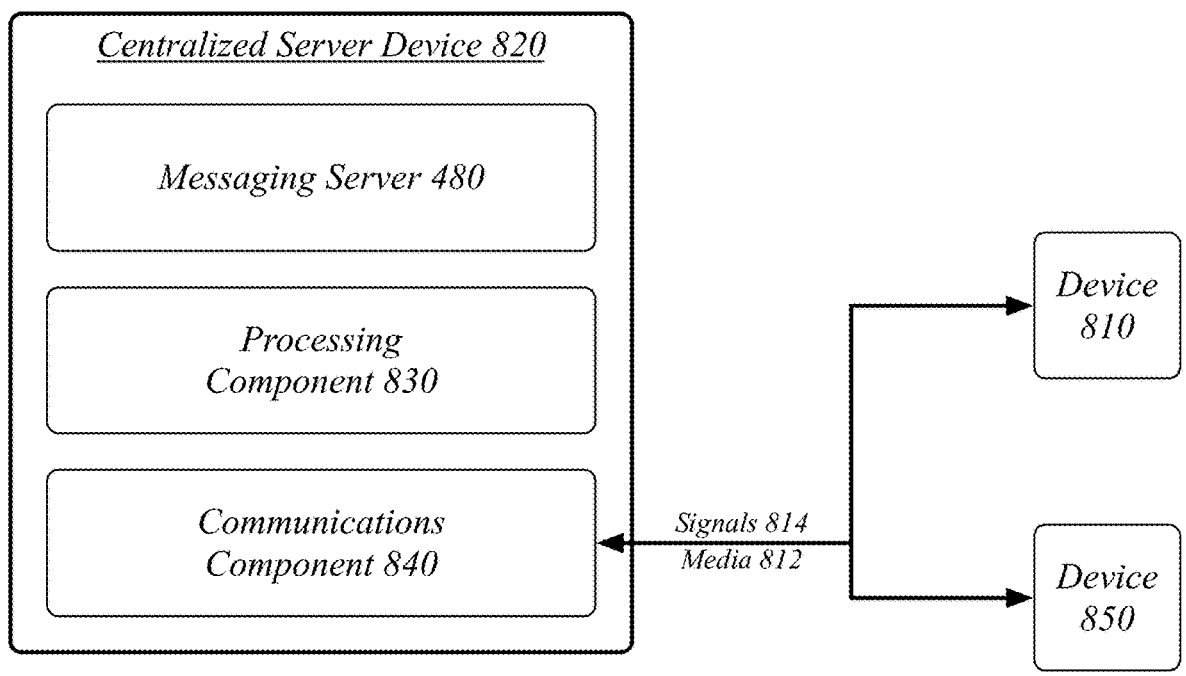
FIG. 8 illustrates an embodiment of a centralized system for the system of FIG. 1.

FIG. 8 illustrates a block diagram of a centralized system 800. The centralized system 800 may implement some or all of the structure and/or operations for the media distribution and display system 100 in a single computing entity, such as entirely within a single centralized server device 820.

The centralized server device 820 may comprise any electronic device capable of receiving, processing, and sending information for the media distribution and display system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 820 may execute processing operations or logic for the media distribution and display system 100 using a processing component 830. The processing component 830 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 820 may execute communications operations or logic for the media distribution and display system 100 using communications component 840. The communications component 840 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 840 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 812 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 820 may communicate with other devices 820, 825 over a communications media 812 using communications signals 814 via the communications component 840. The devices 820, 825 may be internal or external to the centralized server device 810 as desired for a given implementation.

The centralized system 800 may correspond to an embodiment in which a single messaging server 480 is used executing on a single centralized server device 820. The devices 810, 850 may correspond to client devices—such as recipient client device 390.

Figure 9:
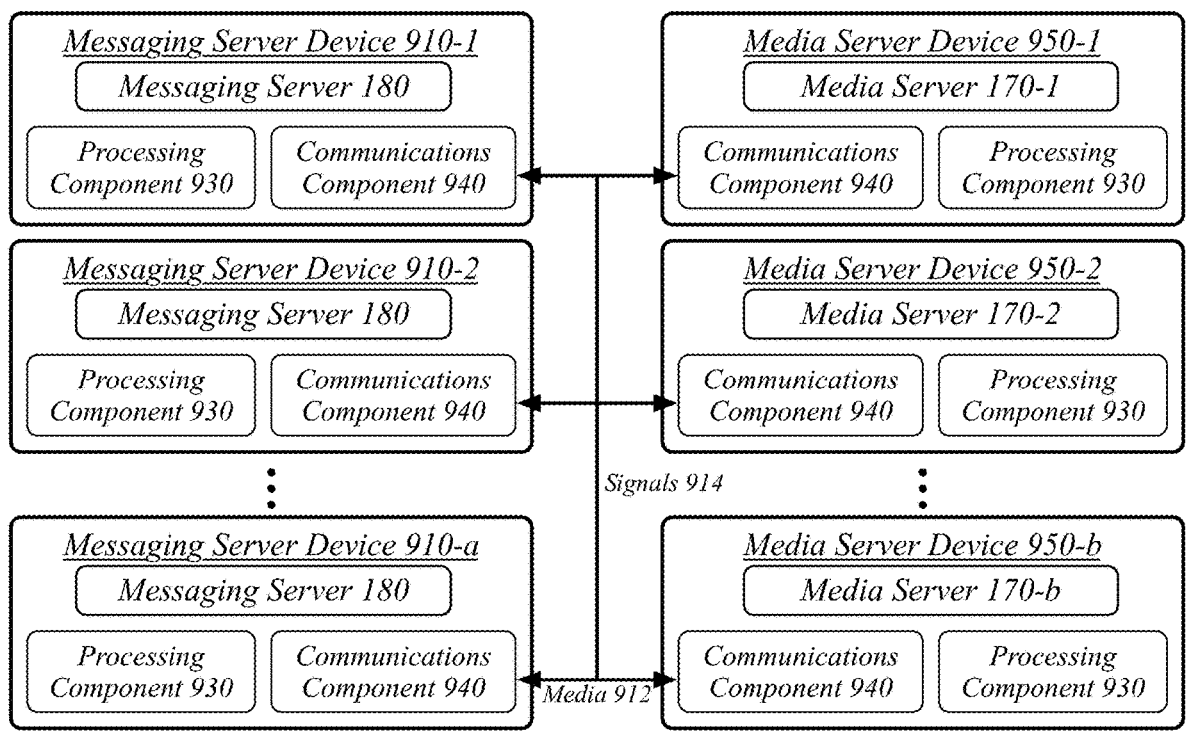
FIG. 9 illustrates an embodiment of a distributed system for the system of FIG. 1.

FIG. 9 illustrates a block diagram of a distributed system 900. The distributed system 900 may distribute portions of the structure and/or operations for the media distribution and display system 100 across multiple computing entities. Examples of distributed system 900 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 900 may comprise a plurality of messaging server devices 910 and a plurality of media server devices 950. In general, the server devices 910, 950 may be the same or similar to the centralized server device 820 as described with reference to FIG. 8. For instance, the server devices 910, 950 may each comprise a processing component 930 and a communications component 940 which are the same or similar to the processing component 830 and the communications component 840, respectively, as described with reference to FIG. 8. In another example, the server devices 910, 950 may communicate over a communications media 912 using communications signals 914 via the communications components 940.

The plurality of messaging server devices 910 may comprise or employ one or more server programs that operate to perform various methodologies in accordance with the described embodiments. In one embodiment, for example, the plurality of messaging server devices 910 may collectively implement the messaging server 480 as a distributed messaging server 480. Each of the messaging server devices 910 may execute a messaging server 480 to collectively provide messaging services to the users of the media distribution and display system 100 as a distributed messaging server system.

The plurality of media server devices 950 may comprise or employ one or more server programs that operate to perform various methodologies in accordance with the described embodiments. In one embodiment, for example, the plurality of media server devices 950 may implement the media servers 470.

Figure 10:
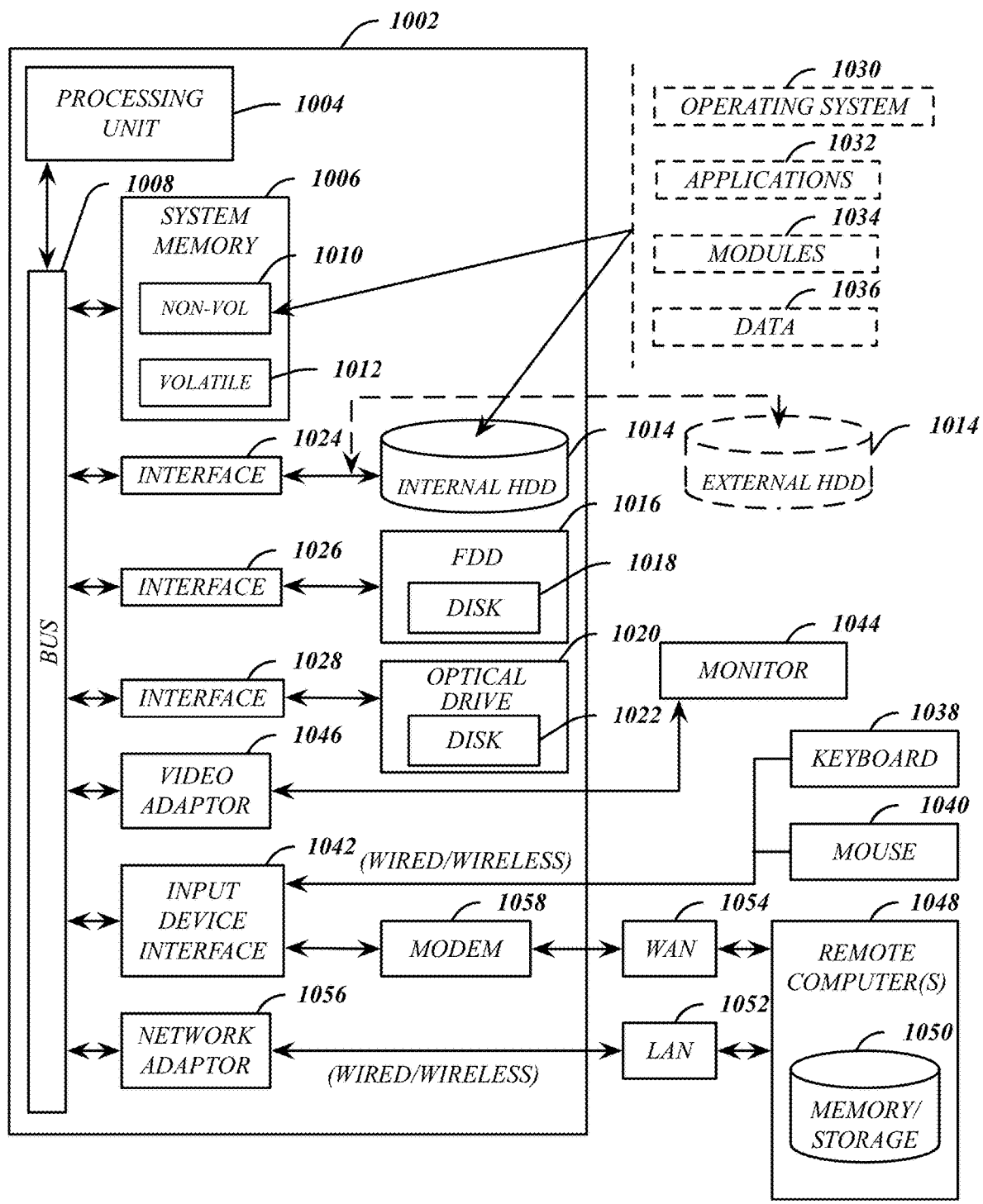
FIG. 10 illustrates an embodiment of a computing architecture.

FIG. 10 illustrates an embodiment of an exemplary computing architecture 1000 suitable for implementing various embodiments as previously described. In one embodiment, the computing architecture 1000 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 comprises a processing unit 1004, a system memory 1006 and a system bus 1008. The processing unit 1004 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1004.

The system bus 1008 provides an interface for system components including, but not limited to, the system memory 1006 to the processing unit 1004. The system bus 1008 can be any of several types of bus structure that may further interconnect to a memory bus (with or without a memory controller), a peripheral bus, and a local bus using any of a variety of commercially available bus architectures. Interface adapters may connect to the system bus 1008 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1000 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1006 can include non-volatile memory 1010 and/or volatile memory 1012. A basic input/output system (BIOS) can be stored in the non-volatile memory 1010.

The computer 1002 may include various types of computer-readable storage media in the form of one or more lower speed memory units, including an internal (or external) hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1010, 1012, including an operating system 1030, one or more application programs 1032, other program modules 1034, and program data 1036. In one embodiment, the one or more application programs 1032, other program modules 1034, and program data 1036 can include, for example, the various applications and/or components of the media distribution and display system 100.

A user can enter commands and information into the computer 1002 through one or more wire/wireless input devices, for example, a keyboard 1038 and a pointing device, such as a mouse 1040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1004 through an input device interface 1042 that is coupled to the system bus 1008, but can be connected by other interfaces such as a parallel port, IEEE 1394 serial port, a game port, a USB port, an IR interface, and so forth.

A monitor 1044 or other type of display device is also connected to the system bus 1008 via an interface, such as a video adaptor 1046. The monitor 1044 may be internal or external to the computer 1002. In addition to the monitor 1044, a computer typically includes other peripheral output devices, such as speakers, printers, and so forth.

The computer 1002 may operate in a networked environment using logical connections via wire and/or wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, connects to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 11:
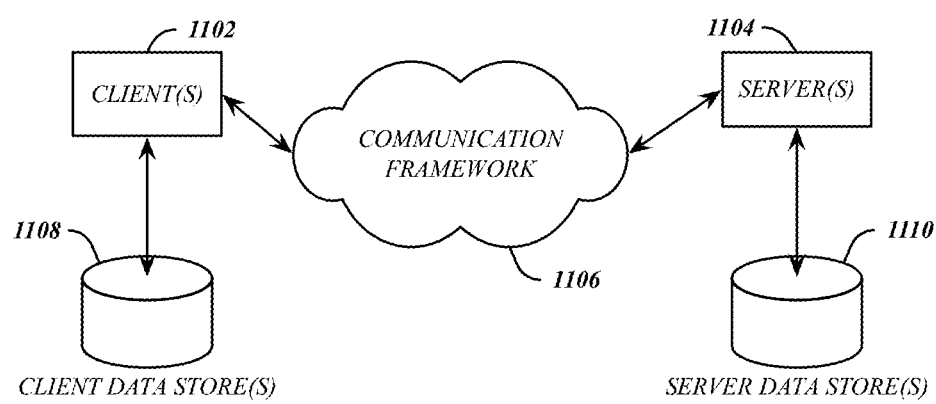
FIG. 11 illustrates an embodiment of a communications architecture.

FIG. 11 illustrates a block diagram of an exemplary communications architecture 1100 suitable for implementing various embodiments as previously described. The communications architecture 1100 includes various common communications elements, such as a transmitter, receiver, transceiver, radio, network interface, baseband processor, antenna, amplifiers, filters, power supplies, and so forth. The embodiments, however, are not limited to implementation by the communications architecture 1100.

As shown in FIG. 11, the communications architecture 1100 comprises includes one or more clients 1102 and servers 1104. The clients 1102 may correspond to the client devices executing messaging clients. The servers 1104 may correspond to messaging servers of the messaging system 200. The clients 1102 and the servers 1104 are operatively connected to one or more respective client data stores 1108 and server data stores 1110 that can be employed to store information local to the respective clients 1102 and servers 1104, such as cookies and/or associated contextual information.

The clients 1102 and the servers 1104 may communicate information between each other using a communication framework 1106. The communications framework 1106 may implement any well-known communications techniques and protocols. The communications framework 1106 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1106 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1102 and the servers 1104. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 12:
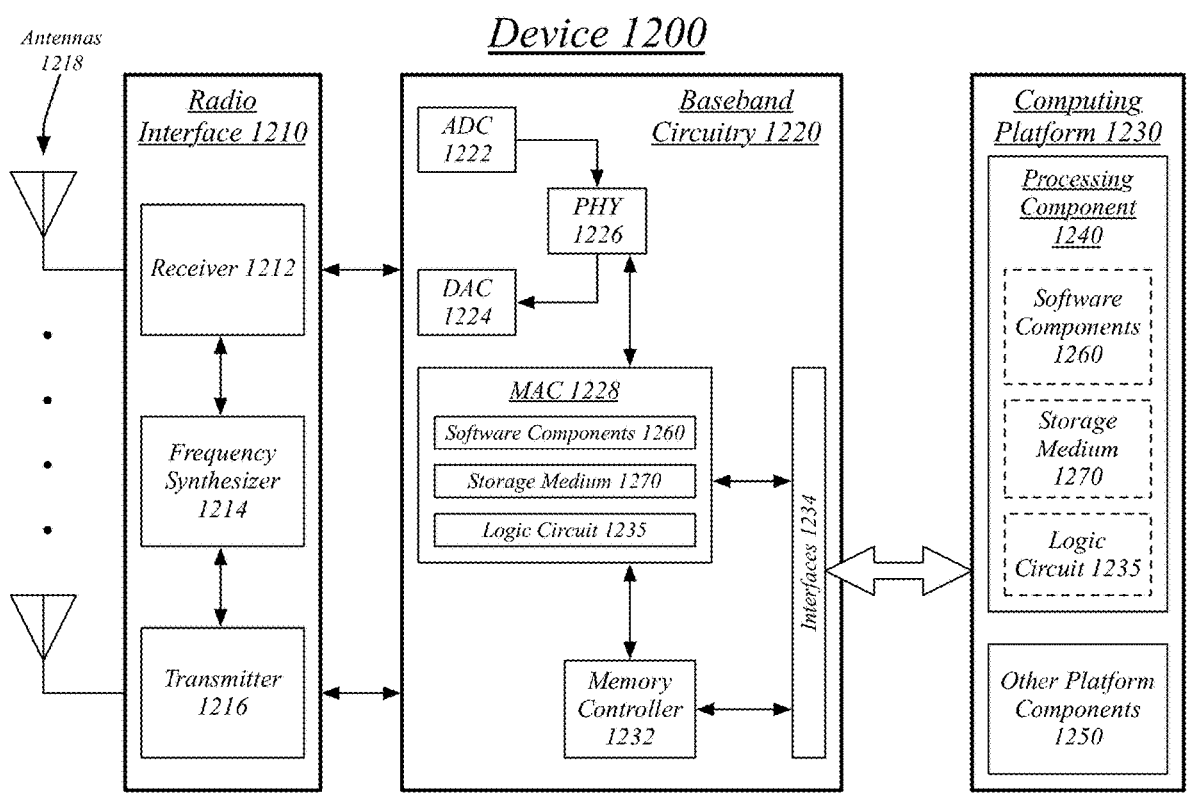
FIG. 12 illustrates an embodiment of a radio device architecture.

FIG. 12 illustrates an embodiment of a device 1200 for use in a multicarrier OFDM system, such as the media distribution and display system 100. Device 1200 may implement, for example, software components 1260 as described with reference to media distribution and display system 100 and/or a logic circuit 1235. The logic circuit 1235 may include physical circuits to perform operations described for the media distribution and display system 100. As shown in FIG. 12, device 1200 may include a radio interface 1210, baseband circuitry 1220, and computing platform 1230, although embodiments are not limited to this configuration.

The device 1200 may implement some or all of the structure and/or operations for the media distribution and display system 100 and/or logic circuit 1235 in a single computing entity, such as entirely within a single device. Alternatively, the device 1200 may distribute portions of the structure and/or operations for the media distribution and display system 100 and/or logic circuit 1235 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1210 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1210 may include, for example, a receiver 1212, a transmitter 1216 and/or a frequency synthesizer 1214. Radio interface 1210 may include bias controls, a crystal oscillator and/or one or more antennas 1218. In another embodiment, radio interface 1210 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1220 may communicate with radio interface 1210 to process receive and/or transmit signals and may include, for example, an analog-to-digital converter 1222 for down converting received signals, a digital-to-analog converter 1224 for up converting signals for transmission. Further, baseband circuitry 1220 may include a baseband or physical layer (PHY) processing circuit 1256 for PHY link layer processing of respective receive/transmit signals. Baseband circuitry 1220 may include, for example, a processing circuit 1228 for medium access control (MAC)/ data link layer processing. Baseband circuitry 1220 may include a memory controller 1232 for communicating with processing circuit 1228 and/or a computing platform 1230, for example, via one or more interfaces 1234.

In some embodiments, PHY processing circuit 1226 may include a frame construction and/or detection module, in combination with additional circuitry such as a buffer memory, to construct and/or deconstruct communication frames, such as radio frames. Alternatively or in addition, MAC processing circuit 1228 may share processing for certain of these functions or perform these processes independent of PHY processing circuit 1226. In some embodiments, MAC and PHY processing may be integrated into a single circuit.

The computing platform 1230 may provide computing functionality for the device 1200. As shown, the computing platform 1230 may include a processing component 1240. In addition to, or alternatively of, the baseband circuitry 1220, the device 1200 may execute processing operations or logic for the media distribution and display system 100 and logic circuit 1235 using the processing component 1240. The processing component 1240 (and/or PHY 1226 and/or MAC 1228) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1230 may further include other platform components 1250. Other platform components 1250 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1200 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1200 described herein, may be included or omitted in various embodiments of device 1200, as suitably desired. In some embodiments, device 1200 may be configured to be compatible with protocols and frequencies associated one or more of the 3GPP LTE Specifications and/or IEEE 1202.16 Standards for WMANs, and/or other broadband wireless networks, cited herein, although the embodiments are not limited in this respect.

Embodiments of device 1200 may be implemented using single input single output (SISO) architectures. However, certain implementations may include multiple antennas (e.g., antennas 1218) for transmission and/or reception using adaptive antenna techniques for beamforming or spatial division multiple access (SDMA) and/or using MIMO communication techniques.

The components and features of device 1200 may be implemented using any combination of discrete circuitry, application specific integrated circuits (ASICs), logic gates and/or single chip architectures. Further, the features of device 1200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise receiving a mixed-contact media display interface invocation in a messaging client for a messaging system; retrieving a plurality of contact-associated media items associated with a plurality of contacts for a user account associated with the messaging client by the messaging system; retrieving an engagement score for each of the plurality of contacts; ordering the plurality of contact-associated media items based on the engagement score for each of the plurality of contacts; and displaying the plurality of contact-associated media items in a mixed-contact media display interface according to the ordering of the plurality of contact-associated media items.

A computer-implemented method may further comprise purging engagement measures that are older than a defined expiration period.

A computer-implemented method may further comprise ordering the plurality of contact-associated media items based on the engagement score for each of the plurality of contacts, a recency measure, and a diversity measure.

A computer-implemented method may further comprise the plurality of contact-associated media items comprising ephemeral media items with a defined expiration period.

A computer-implemented method may further comprise the plurality of contact-associated media items received via a messaging server system for the messaging system using end-to-end encryption, the end-to-end encryption denying the messaging server system access to the media content of the plurality of contact-associated media items, the ordering the plurality of contact-associated media items performed based on local data collection on a client device executing the messaging client.

A computer-implemented method may further comprise the messaging client comprising a client-side feature datastore, the client-side feature datastore comprising a plurality of engagement measures for each of the plurality of contacts, the engagement score for each of the plurality of contacts calculated based on combining the plurality of engagement measures for each of the plurality of contacts using a set of defined engagement measure weights.

A computer-implemented method may further comprise receiving the set of defined engagement measure weights from the messaging server system, the set of defined engagement measure weights determined by the messaging server system based on engagement success measures received from client devices of the messaging system, the engagement success measures representing differences between media item ranking and actual user engagement.

A computer-implemented method may further comprise the engagement success measures comprising two or more of a view time score, a reply score, an ignored status score, and a re-watch score.

A computer-implemented method may further comprise the plurality of engagement measures corresponding to a plurality of event types, wherein each of the plurality of event types is represented by a plurality of decay-rate-specific engagement measures.

A computer-implemented method may further comprise the plurality of event types comprising two or more of a row seen event, a row consumed event, a row ignored event, a row view engagement event, a row reply engagement event, an incoming message event, an outgoing message event, an incoming media event, an outgoing media event, an incoming group message event, an outgoing group message event, an incoming group media event, an outgoing group media event, an incoming call event, an outgoing call event, a call incoming media event, and a call outgoing media event.

A computer-implemented method may further comprise detecting an engagement event associated with a contact; retrieving a plurality of decay-rate-specific aggregate engagement measures corresponding to an event type of the engagement event, the plurality of decay-rate-specific aggregate engagement measures aggregated across all contacts in the messaging client; decreasing the plurality of decay-rate-specific aggregate engagement measures according to a defined decay rate for each of the plurality of decay-rate-specific aggregate engagement measures and an amount of time between a current time and an update timestamp for the plurality of decay-rate-specific aggregate engagement measures; increasing the plurality of decay-rate-specific aggregate engagement measures based on the engagement event; and storing the plurality of decay-rate-specific aggregate engagement measures.

A computer-implemented method may further comprise normalizing the plurality of decay-rate-specific engagement measures for each of the plurality of contacts based on the plurality of decay-rate-specific aggregate engagement measures to generate a plurality of normalized decay-rate-specific engagement measures for each of the plurality of contacts; and decreasing the plurality of normalized decay-rate-specific aggregate engagement measures according to a defined decay rate for each of the plurality of decay-rate-specific engagement measures and an amount of time between a current time and an update timestamp for the plurality of decay-rate-specific engagement measures; the engagement score for each of the plurality of contacts calculated based on combining the plurality of normalized decay-rate-specific engagement measures for each of the plurality of contacts using the set of defined engagement measure weights.

A computer-implemented method may further comprise adjusting each of the plurality of engagement measures according to a defined decay rate for each of the plurality of engagement measures and a timestamp for each of the plurality of engagement measures prior to combining the plurality of engagement measures.

A computer-implemented method may further comprise detecting an engagement event associated with a contact; retrieving a plurality of decay-rate-specific engagement measures for the contact corresponding to an event type of the engagement event; decreasing the plurality of decay-rate-specific engagement measures according to a defined decay rate for each of the plurality of decay-rate-specific engagement measures and an amount of time between a current time and an update timestamp for the plurality of decay-rate-specific engagement measures; increasing the plurality of decay-rate-specific engagement measures based on the engagement event; and storing the plurality of decay-rate-specific engagement measures in association with the contact.

A computer-implemented method may further comprise receiving an incoming contact-associated media item from an incoming-item contact; generating an engagement score for the incoming-item contact; and ranking the incoming contact-associated media item according to the engagement score for the incoming-item contact.

An apparatus may comprise a media management component operative to retrieve a plurality of contact-associated media items associated with a plurality of contacts for a user account associated with a messaging client by a messaging system; retrieve an engagement score for each of the plurality of contacts; and order the plurality of contact-associated media items based on the engagement score for each of the plurality of contacts; and a user interface component operative to receive a mixed-contact media display interface invocation in the messaging client for the messaging system; and display the plurality of contact-associated media items in a mixed-contact media display interface according to the ordering of the plurality of contact-associated media items. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:
retrieving a plurality of contact-associated media items associated with a plurality of contacts for a user account associated with a messaging client by a messaging system;
retrieving an engagement score for each of the plurality of contacts;
ordering the plurality of contact-associated media items based on the engagement score for each of the plurality of contacts; and
displaying the plurality of contact-associated media items in a mixed-contact media display interface according to the ordering of the plurality of contact-associated media items, and
the engagement score for each contact calculated by combining a plurality of engagement measures for each contact using a set of defined engagement measure weights, and
the set of defined engagement measure weights is based on engagement success measures received from client devices of the messaging system, the engagement success measures representing differences between media item ranking and actual user engagement.

2. The method of claim 1, the plurality of contact-associated media items received via a messaging server system for the messaging system using end-to-end encryption, the end-to-end encryption denying the messaging server system access to the media content of the plurality of contact-associated media items, the ordering the plurality of contact-associated media items performed based on local data collection on a client device executing the messaging client.

3. The method of claim 1, the messaging client comprising a client-side feature datastore, the client-side feature datastore comprising the plurality of engagement measures for each of the plurality of contacts.

4. The method of claim 3, further comprising:
receiving the set of defined engagement measure weights from the messaging server system.

5. The method of claim 3, the plurality of engagement measures corresponding to a plurality of event types, wherein each of the plurality of event types is represented by a plurality of decay-rate-specific engagement measures, the plurality of event types comprising two or more of a row seen event, a row consumed event, a row ignored event, a row view engagement event, a row reply engagement event, an incoming message event, an outgoing message event, an incoming media event, an outgoing media event, an incoming group message event, an outgoing group message event, an incoming group media event, an outgoing group media event, an incoming call event, an outgoing call event, a call incoming media event, and a call outgoing media event.

6. The method of claim 3, the plurality of engagement measures corresponding to a plurality of event types, wherein each of the plurality of event types is represented by a plurality of decay-rate-specific engagement measures, further comprising:
detecting an engagement event associated with a contact;
retrieving a plurality of decay-rate-specific aggregate engagement measures corresponding to an event type of the engagement event, the plurality of decay-rate-specific aggregate engagement measures aggregated across all contacts in the messaging client;
decreasing the plurality of decay-rate-specific aggregate engagement measures according to a defined decay rate for each of the plurality of decay-rate-specific aggregate engagement measures and an amount of time between a current time and an update timestamp for the plurality of decay-rate-specific aggregate engagement measures;
increasing the plurality of decay-rate-specific aggregate engagement measures based on the engagement event; and
storing the plurality of decay-rate-specific aggregate engagement measures.

7. The method of claim 6, further comprising:
normalizing the plurality of decay-rate-specific engagement measures for each of the plurality of contacts based on the plurality of decay-rate-specific aggregate engagement measures to generate a plurality of normalized decay-rate-specific engagement measures for each of the plurality of contacts; and
decreasing the plurality of normalized decay-rate-specific aggregate engagement measures according to a defined decay rate for each of the plurality of decay-rate-specific engagement measures and an amount of time between a current time and an update timestamp for the plurality of decay-rate-specific engagement measures;
the engagement score for each of the plurality of contacts calculated based on combining the plurality of normalized decay-rate-specific engagement measures for each of the plurality of contacts using the set of defined engagement measure weights.

8. The method of claim 1, further comprising:
detecting an engagement event associated with a contact;
retrieving a plurality of decay-rate-specific engagement measures for the contact corresponding to an event type of the engagement event;
decreasing the plurality of decay-rate-specific engagement measures according to a defined decay rate for each of the plurality of decay-rate-specific engagement measures and an amount of time between a current time and an update timestamp for the plurality of decay-rate-specific engagement measures;
increasing the plurality of decay-rate-specific engagement measures based on the engagement event; and
storing the plurality of decay-rate-specific engagement measures in association with the contact.

9. An apparatus, comprising:
at least one processor operable to execute stored instructions that, when executed, cause the at least one processor to:
retrieve a plurality of contact-associated media items associated with a plurality of contacts for a user account associated with a messaging client by a messaging system;
retrieve an engagement score for each of the plurality of contacts;
order the plurality of contact-associated media items based on the engagement score for each of the plurality of contacts; and
display the plurality of contact-associated media items in a mixed-contact media display interface according to the ordering of the plurality of contact-associated media items, and
the engagement score for each contact calculated by combining a plurality of engagement measures for each contact using a set of defined engagement measure weights, and
the set of defined engagement measure weights is based on engagement success measures received from client devices of the messaging system, the engagement success measures representing differences between media item ranking and actual user engagement.

10. The apparatus of claim 9, the messaging client comprising a client-side feature datastore, the client-side feature datastore comprising the plurality of engagement measures for each of the plurality of contacts.

11. The apparatus of claim 10, the at least one processor further caused to:
receive the set of defined engagement measure weights from the messaging server system.

12. The apparatus of claim 10, the plurality of engagement measures corresponding to a plurality of event types, wherein each of the plurality of event types is represented by a plurality of decay-rate-specific engagement measures, the plurality of event types comprising two or more of a row seen event, a row consumed event, a row ignored event, a row view engagement event, a row reply engagement event, an incoming message event, an outgoing message event, an incoming media event, an outgoing media event, an incoming group message event, an outgoing group message event, an incoming group media event, an outgoing group media event, an incoming call event, an outgoing call event, a call incoming media event, and a call outgoing media event.

13. The apparatus of claim 10, the plurality of engagement measures corresponding to a plurality of event types, wherein each of the plurality of event types is represented by a plurality of decay-rate-specific engagement measures, the at least one processor further caused to:
detect an engagement event associated with a contact; and
retrieve a plurality of decay-rate-specific aggregate engagement measures corresponding to an event type of the engagement event, the plurality of decay-rate-specific aggregate engagement measures aggregated across all contacts in the messaging client; decrease the plurality of decay-rate-specific aggregate engagement measures according to a defined decay rate for each of the plurality of decay-rate-specific aggregate engagement measures and an amount of time between a current time and an update timestamp for the plurality of decay-rate-specific aggregate engagement measures; increase the plurality of decay-rate-specific aggregate engagement measures based on the engagement event; and store the plurality of decay-rate-specific aggregate engagement measures.

14. The apparatus of claim 9, the at least one processor further caused to:
normalize the plurality of decay-rate-specific engagement measures for each of the plurality of contacts based on the plurality of decay-rate-specific aggregate engagement measures to generate a plurality of normalized decay-rate-specific engagement measures for each of the plurality of contacts; and
decrease the plurality of normalized decay-rate-specific aggregate engagement measures according to a defined decay rate for each of the plurality of decay-rate-specific engagement measures and an amount of time between a current time and an update timestamp for the plurality of decay-rate-specific engagement measures;
the engagement score for each of the plurality of contacts calculated based on combining the plurality of normalized decay-rate-specific engagement measures for each of the plurality of contacts using the set of defined engagement measure weights.

15. At least one computer-readable storage medium comprising instructions that, when executed, cause a system to:
retrieve a plurality of contact-associated media items associated with a plurality of contacts for a user account associated with a messaging client by a messaging system;
retrieve an engagement score for each of the plurality of contacts;
order the plurality of contact-associated media items based on the engagement score for each of the plurality of contacts; and
display the plurality of contact-associated media items in a mixed-contact media display interface according to the ordering of the plurality of contact-associated media items, and
the engagement score for each contact calculated by combining a plurality of engagement measures for each contact using a set of defined engagement measure weights, and
the set of defined engagement measure weights is based on engagement success measures received from client devices of the messaging system, the engagement success measures representing differences between media item ranking and actual user engagement.

16. The computer-readable storage medium of claim 15, the messaging client comprising a client-side feature datastore, the client-side feature datastore comprising the plurality of engagement measures for each of the plurality of contacts.

17. The computer-readable storage medium of claim 16, comprising further instructions that, when executed, cause a system to:
receive the set of defined engagement measure weights from the messaging server system.

18. The computer-readable storage medium of claim 16, the plurality of engagement measures corresponding to a plurality of event types, wherein each of the plurality of event types is represented by a plurality of decay-rate-specific engagement measures, the plurality of event types comprising two or more of a row seen event, a row consumed event, a row ignored event, a row view engagement event, a row reply engagement event, an incoming message event, an outgoing message event, an incoming media event, an outgoing media event, an incoming group message event, an outgoing group message event, an incoming group media event, an outgoing group media event, an incoming call event, an outgoing call event, a call incoming media event, and a call outgoing media event.

19. The computer-readable storage medium of claim 16, the plurality of engagement measures corresponding to a plurality of event types, wherein each of the plurality of event types is represented by a plurality of decay-rate-specific engagement measures, comprising further instructions that, when executed, cause a system to:
detect an engagement event associated with a contact;
retrieve a plurality of decay-rate-specific aggregate engagement measures corresponding to an event type of the engagement event, the plurality of decay-rate-specific aggregate engagement measures aggregated across all contacts in the messaging client;
decrease the plurality of decay-rate-specific aggregate engagement measures according to a defined decay rate for each of the plurality of decay-rate-specific aggregate engagement measures and an amount of time between a current time and an update timestamp for the plurality of decay-rate-specific aggregate engagement measures;

increase the plurality of decay-rate-specific aggregate engagement measures based on the engagement event; and store the plurality of decay-rate-specific aggregate engagement measures.

20. The computer-readable storage medium of claim 15, comprising further instructions that, when executed, cause a system to:

normalize the plurality of decay-rate-specific engagement measures for each of the plurality of contacts based on the plurality of decay-rate-specific aggregate engagement measures to generate a plurality of normalized decay-rate-specific engagement measures for each of the plurality of contacts; and decrease the plurality of normalized decay-rate-specific aggregate engagement measures according to a defined decay rate for each of the plurality of decay-rate-specific engagement measures and an amount of time between a current time and an update timestamp for the plurality of decay-rate-specific engagement measures;

the engagement score for each of the plurality of contacts calculated based on combining the plurality of normalized decay-rate-specific engagement measures for each of the plurality of contacts using the set of defined engagement measure weights.

* * * * *